Patented July 14, 1925.

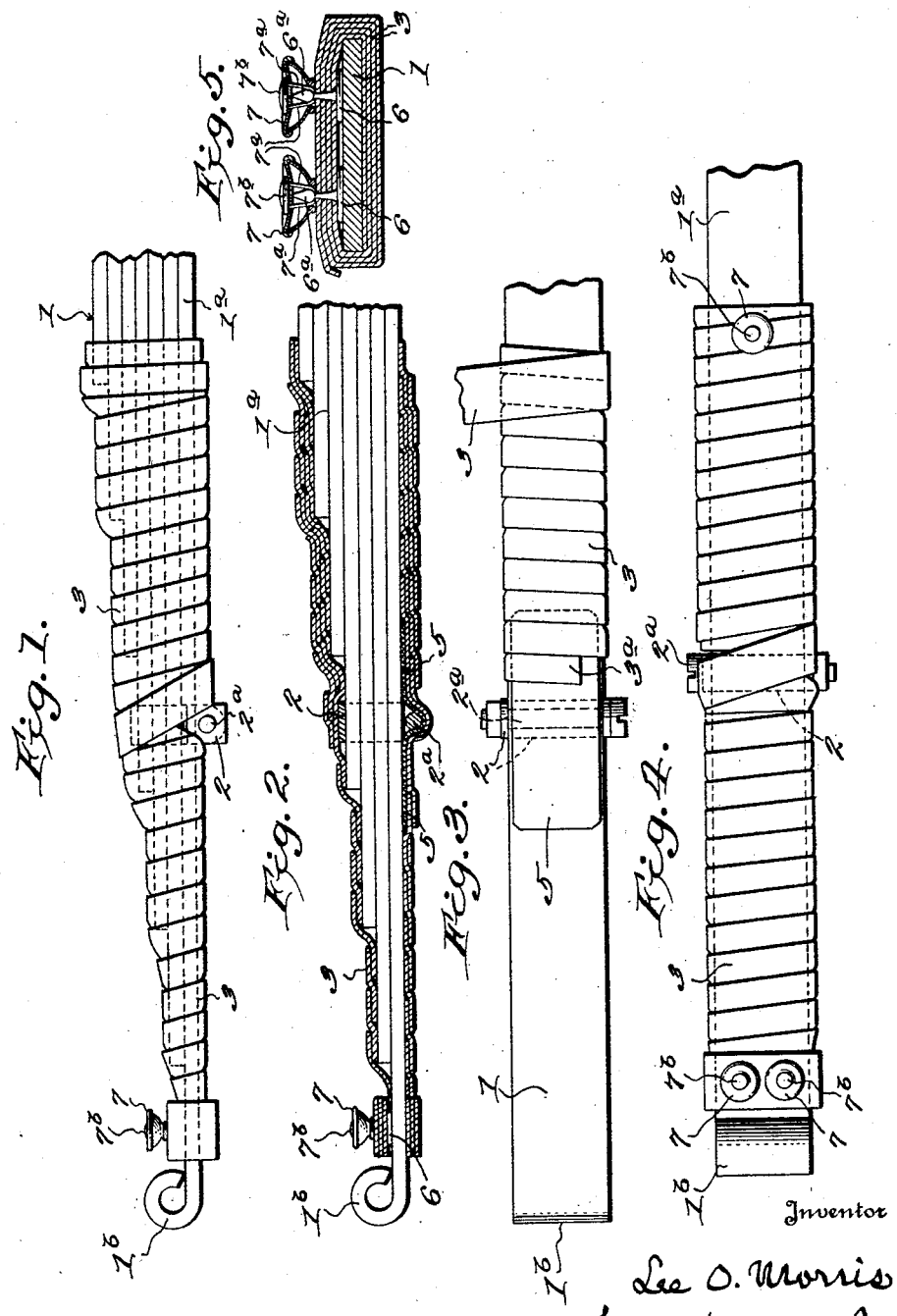

1,546,098

UNITED STATES PATENT OFFICE.

LEE O. MORRIS, OF WHEELING, WEST VIRGINIA.

PROTECTOR AND LUBRICANT RETAINER FOR VEHICLE SPRINGS.

Application filed December 2, 1924. Serial No. 753,459.

*To all whom it may concern:*

Be it known that I, LEE O. MORRIS, a citizen of the United States of America, and resident of Wheeling, county of Ohio, State of West Virginia, have invented certain new and useful Improvements in and Relating to Protectors and Lubricant Retainers for Vehicle Springs, of which the following is a specification.

This invention relates to the retention of lubricant on and in and the protection of multi-leaf springs, such as motor vehicle springs; and the objects and nature of the invention will be readily understood by those skilled in the art in the light of the following description of the accompanying drawings that illustrate what I now believe to be the preferred mechanical expression or embodiment of my invention from among other forms and arrangements within the spirit and scope thereof.

It is an object of the invention to provide an exceedingly economical, effective, durable, securely-fastened, and easily applied lubricant retainer and protector for motor vehicle leaf springs and the like.

With this and other objects in view, my invention consists in certain novel features, arrangements and combinations, as more fully and particularly set forth and specified hereinafter.

Referring to the accompanying drawings forming part hereof:—

Fig. 1 is a side elevation of the portion of a motor vehicle leaf spring equipped with an embodiment of my invention.

Fig. 2 shows said spring and the device of my invention, of Fig. 1, in longitudinal vertical section.

Fig. 3 is a bottom plan of the portion of the spring illustrated by Fig. 1 showing the spring partially wrapped and illustrating in plan the fabric cover piece for the clip bolt.

Fig. 4 is a top plan of the construction shown by Fig. 1, illustrating in addition securing buttons or other fasteners at both ends of the spring cover.

Fig. 5 is a cross section through the spring cover and small end of the spring illustrating a form of securing button or fastener that can be employed.

In the drawings, I show the portion of a leaf spring 1, that I desire to cover for the retention of lubricant on the spring and between the leaves thereof and for the protection of the spring to exclude moisture, grit and other objectionable foreign matter. As an example, I show part of a motor vehicle spring 1, made up of a plurality of superimposed leaves of different lengths secured together in any suitable manner or by any desirable means at the thick body $1^a$ of the spring, at which portion the spring is secured to either the vehicle axle or to the vehicle frame. The spring tapers or longitudinally reduces in thickness from said body $1^a$, to the shackle bolt boss or eye $1^b$, at the thin free end of the spring.

At a point intermediate the body $1^a$, and end eye $1^b$, the spring is embraced by the usual U-shaped clip 2, and its transverse clamping bolt $2^a$, for maintaining the alinement of the spring leaves.

I cover and completely enclose this spring, in a peculiar manner, throughout its length from approximately where the body $1^a$, is bolted or secured up to the shackle eye $1^b$.

Before this cover of my invention is applied, the spring is thoroughly cleansed to remove dust, grit and dirt from the surfaces thereof, and the meeting or engaging surfaces of the spring leaves are thoroughly lubricated and the exterior surfaces of the spring are usually coated with grease or other lubricant.

When the spring has thus been prepared, for covering, I apply thereto a suitable enclosing lubricant-retaining spiral wrapping throughout the length of the spring substantially as hereinbefore defined.

This wrapping is composed of non-adhesive flexible weather or waterproofed fabric.

For instance, I employ for this purpose, strong durable flexible woven fabric that is rendered impervious to oil, grease and water by any suitable method or means, although the fabric usually employed has the woven fabric exposed and non-adhesive on one side, the inner side, while the waterproofing process provides the exposed or outer side of the fabric with a glaze or smooth flexible coating. I can, for instance, employ water or weatherproofed woven fabric such as is commonly used for automobile top covering, as such material is glazed or coated on the outer surface with the woven fabric exposed at the inner surface. The material is of such characteristics that it can be bent over a square angle or corner of the spring without cracking or breaking the glaze. This fabric is so wrapped on the spring that the glazed surface forms the exposed outer surface of the wrapping with the non-adhesive inner surface of the woven material engaging the spring and overlapping the glazed surfaces of the spiral convolutions.

The wrapping is composed of a long narrow flat ribbon 3, of this fabric. For instance, this ribbon can be twelve feet long, more or less, and an inch and a half in width more or less; the length of the ribbon depending on the length and cross sectional dimensions of the spring portion to be covered. Starting with one of its ends, this ribbon 3, is wound spirally around the spring, advancing each complete convolution approximately one half the width of the fabric strip or ribbon so that the spiral convolutions overlap about one half the width of the ribbon, say about three quarters of an inch, leaving the glazed outer surface of each convolution exposed about three quarters of an inch of its width.

An important problem is involved in so wrapping the spring, where a spirally wound ribbon is employed, as to prevent undesirable loosening and detachment of the wrapping, while retaining the lubricant and excluding moisture and grit, and thus permitting removal and re-application of the wrapping, and rendering it possible for unskilled persons to apply and secure the wrapping.

I have successfully solved this problem by wrapping in a definite manner, substantially as hereinafter set forth, and by securing the wrapping by any suitable means, preferably as set forth hereinafter.

The wrapping, broadly, is preferably applied or wrapped from the thick portion of the spring toward the thin or free end thereof. However, I have discovered, that the wrapping is more effectively secured against subsequent accidental loosening, if it is started with the end $3^a$, of the fabric ribbon, at a point between the clip and the base or thickest portion of the spring, say about four or five inches from the point where the thick part of the spring is secured. The ribbon beginning with end $3^a$, is then spirally wrapped tightly around the spring (with the convolutions overlapping as before described) toward the thickest portion of the spring. The wrappings are thus continued as far as possible or desired onto the thick portion of base of the spring. When the wrapping reaches the limit to be covered on the spring base, the direction of winding is reversed and the spiral wrapping is continued toward the free or thin end of the spring and over and covering the first mentioned wrapping layer and tightly compressing the same. The spiral wrapping is thus continued past the spring clip and up to the transverse shackle bolt eye or boss of the spring, with the convolutions tightly overlapping, to cover and enclose the spring between said eye and the point where the double wrapping terminates on the spring base. However, a peculiar wrapping arrangement and added element are provided at the spring clip, to reduce the possibility of access of grit and escape of lubricant, past or around the clip. For instance, I arrange a flat strip or length 5, of the weather-proofed woven fabric, preferably, the same kind of fabric as employed for the spiral wrapping, over the clamping bolt of the clip and longitudinally along and against the side face of the spring, extending in opposite directions from said bolt. The width of this strip 5 is at least equal to the width of the spring and the distance between the legs of the clip. The bolt is hence covered by the strip 5 and traverses the under surface thereof about midway the length of the strip. The strip 5, is thus arranged before the spiral wrapping reaches the clip. After this strip has been thus arranged on the side of the spring and covering the clip bolt, the spiral wrapping is continued past the clip to cover and grip the strip 5 (except the portion over the bolt) against the surface of the spring. The spiral wrapping is continued back and forth across the clip, to approximately cover the same, approximately as shown, and then the wrapping is continued from the clip to the eye with the half overlapping spiral convolutions.

When the tight spiral wrapping at the eye or free end of the spring is completed, the remaining free end $3^b$, of the single long ribbon or strip 3, is wrapped several times around the spring end to form concentric overlying convolutions and the extremity of the ribbon or strip is fastened to said convolutions by one or more detachable puncturing fastening means. For instance, as an example of a puncturing fastening means, from among others, that I can employ, I show a flat base or head 6, rigid with and carrying an upright rigid pointed shank or puncturing pin $6^a$, which in this instance has an arrow head point thus providing a contraction below the point. One (or more) of these fasteners is placed with its base resting on the flat face of the spring end, where said end is to be embraced by the final concentric multi-ply wrapping convolutions. In forming said final convolutions, a ply of each convolution is punctured by the pin $6^a$, the convolution being pressed down on the pin to the limit, and the remaining free end of the wrapping strip or ribbon is also punctured by the pin and pressed down thereon. The projecting end of the pin can then be bent down to secure the wrapping plies together or a suitable securing head can be applied to the projecting pin to secure the wrapping plies. In the particular example shown, I illustrate a detachable button 7, for this purpose, that has a central transverse hollow shank or hub to removably receive the point of the pin. This bottom is equipped with spring fingers 7ª carried by a knob or head 7ᵇ, the fingers being longitudinally movable in the hollow shank to lock the button to and release the same from the arrow head of the pin. The locking springs are moved to lock and release the pin by the head or knob 7ᵇ exposed at the outer side of the button.

If so desired, such a strip or ribbon puncturing fastening can also be employed at the opposite end of the wrapping, namely, to fasten together the overlying end convolutions of the wrapping at the thick or base portion of the spring although I do not wish to so limit my invention.

By thus providing the long fabric ribbon wrapping with a puncturing fastening, the overlapping final convolutions are securely fastened together against loosening, and the entire wrapping is maintained tight, and yet the end convolutions can be unwrapped and stripped from the fastener, should it be desirable to remove the spring wrapping for relubricating the spring preparatory to again applying and fastening the wrapping.

The peculiar water and grease proof woven fabric, described, possesses great tensile strength, is exceedingly durable, is flexible without breaking or cracking, and is of particular advantage for the purposes of my invention. The glazed or smooth coated surface of the fabric forms the exposed outer surface of the wrapping, and this surface sheds water, grease and dust does not readily adhere thereto, and said surface can be easily cleaned by rubbing. The exposed woven fabric at the inner surface of the wrapping contacts the spring surface, and is exposed to the lubricant, and is of peculiar advantage in this relation because of its tendency to absorb lubricant and cooperate with the glazed surfaces overlapped to prevent entrance of grit and moisture and exudation of lubricant.

Without desiring to limit my invention to the exact disclosures hereof, what I claim is:

1. A leaf spring lubricant-retaining and protecting cover composed of an elongated narrow flat flexible ribbon formed for spiral wrapping around the spring with the spiral wrappings overlapping, in combination with a ribbon puncturing fastening having a base to abut a spring face and an upstanding puncturing pin formed to puncture and retain overlying end convolutions of said ribbon.

2. A leaf spring lubricant-retaining and protecting cover consisting of a long narrow flat flexible woven fabric ribbon having the woven fabric exposed on one side and a glazed or waterproofed coating on the other side, said ribbon being formed for tight spiral wrapping around the spring convolutions overlapping about one-half the width of the ribbon and with the glazed coating at the outer side of the wrapping, in combination with a fastening.

3. A motor vehicle spring cover consisting of a spiral wrapping of non-adhesive fabric ribbon and a fabric strip longitudinally fitting a spring face under the wrapping and intermediate its length extending over and covering the clamping bolt of the spring clip.

4. A motor vehicle spring having a spiral wrapping of non-adhesive fabric, said wrapping being doubled at the large end of the spring and multi-ply and fastened at the small end of the spring.

5. A motor vehicle spring having a spring clip intermediate the base of the spring and the free end of the spring that is provided with the shackle boss, said spring covered by a spiral fabric wrapping, and a fabric strip laid on a face of the spring and covering the bolt of the spring clip, the wrapping securing the fabric strip and approximately covering the same and the clip.

6. A cover for motor vehicle spring consisting of an elongated narrow flat fabric ribbon and a ribbon puncturing fastener having a ribbon confining button.

7. An elongated leaf spring having a lubricant-retaining cover consisting essentially of a spiral wrapping of overlapping convolutions extending longitudinally of the spring, and end fastening means for the wrapping, said wrapping consisting of a long narrow flat fabric ribbon spirally wound around the spring beginning at one end of the ribbon and extending longitudinally of the spring toward one end thereof and then reversing and spirally wound in the opposite direction covering the first portion of the wrapping and said ribbon end, and extending toward the other spring end, the other end of the ribbon being secured by said fastening means.

8. A lubricant-retaining protective cover for a vehicle spring consisting essentially of a long flat narrow fabric ribbon constructed and formed to be spirally wrapped around the spring longitudinally thereof with overlying end convolutions, and a fastener for said ribbon formed to be held between the convolutions and the spring and embodying a perpendicular shank to transversely puncture said convolutions and retain them against loosening.

Signed at Wheeling, West Virginia, this 28th day of November, 1924.

LEE O. MORRIS.